US012435491B1

(12) United States Patent
Carton

(10) Patent No.: US 12,435,491 B1
(45) Date of Patent: Oct. 7, 2025

(54) HYDRAULIC CYLINDER WITH AN INTEGRATED PRESSURE RELIEF SYSTEM

(71) Applicant: Deere & Company, Moline, IL (US)

(72) Inventor: Jason K. Carton, Geneseo, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/627,111

(22) Filed: Apr. 4, 2024

(51) Int. Cl.
*E02F 9/22* (2006.01)

(52) U.S. Cl.
CPC ............ *E02F 9/2264* (2013.01); *E02F 9/226* (2013.01)

(58) Field of Classification Search
CPC .......... F15B 2211/30515; E02F 9/2264; E02F 9/226
See application file for complete search history.

(56) References Cited

U.S. PATENT DOCUMENTS

| 3,982,469 | A | 9/1976 | Bianchetta |
| 5,558,380 | A | 9/1996 | Meyer et al. |
| 10,066,644 | B2 | 9/2018 | Opdenbosch |
| 10,927,856 | B2 * | 2/2021 | Imam ................... F15B 7/006 |

FOREIGN PATENT DOCUMENTS

| EP | 3523541 A1 * | 8/2019 | ........... A01G 23/087 |
| EP | 3523541 B1 | 12/2022 | |
| JP | 2006077946 A | 3/2006 | |

OTHER PUBLICATIONS

"The Ensign Range of Forestry Products Cover Equipment for All Log, Timber and Gerneral Materials Handling," Ensign, [retrieved on Mar. 14, 2024], 5 pages, Retrieved from Internet: <https://www.ensign.co.nz/>.
"Rotating Grapples," Ensign, Specification sheet [online], [retrieved on Mar. 14, 2024], 1 page, Retrieved from Internet: <https://www.ensign.co.nz/downloads/1730.pdf>.
"Heavry Duty Grapples," NYE, [retrieved on Mar. 14, 2024], 3 pages, Retrieved from Internet: <https://nyemanufacturing.com/>.
"Together, We Raise the Bar Higher.," ROTOBEC, [retrieved on Mar. 14, 2024], 8 pages, Retrieved from Internet: <https://rotobec.com>.
"Log Grapple," ROTOBEC, [retrieved on Mar. 14, 2024], 6 pages, Retrieved from Internet: <https://rotobec.com/attachments/products/log-grapple>.

(Continued)

*Primary Examiner* — Abiy Teka
(74) *Attorney, Agent, or Firm* — Tucker Ellis LLP; Patrick F. Clunk

(57) ABSTRACT

A grapple hydraulic cylinder may comprise a barrel body, a piston-rod assembly, a cap operably connected to the barrel body, and a pressure relief system. The pressure relief system may be operably connected to a rod side chamber and a cap side chamber. The pressure relief system may comprise a first valve and a second valve. The second valve may be a relief valve configured to open upon the cap side chamber reaching a determined pressure and moving hydraulic fluid from the cap side chamber to the rod side chamber while the first valve simultaneously maintains the locked position. Pressure in the cap side chamber is reduced, and pressure in the rod side chamber increases. A similar configuration may be utilized to move hydraulic fluid from the rod side chamber to the cap side chamber to reduce pressure in the rod side chamber.

19 Claims, 8 Drawing Sheets

(56) References Cited

OTHER PUBLICATIONS

"Tough Reliable Productive," Tigercat | TCi, [retrieved on Mar. 14, 2024], 7 pages, Retrieved from Internet: <https://www.tigercat.com/>.

LG5057 Grapply, Tigercat | TCi, [retrieved on Mar. 14, 2024], 6 pages, Retrieved from Internet: <https://www.tigercat.com/product/lg5057-grapple/>.

* cited by examiner

HYDRAULIC CYLINDER WITH AN INTEGRATED PRESSURE RELIEF SYSTEM

BACKGROUND

Grapples can be utilized with a variety of work machines in the agricultural, construction and forestry industries, including without limitation, with excavators, tractors, cranes, and loaders. The hydraulically powered claw-like structures utilize a pinching motion to move a variety of materials from one place to another. Such materials may include logs, rocks, pipe laying, debris, and scrap metal. Grapples may comprise a hydraulic grapple cylinder. At times, the grapple cylinder may experience a pressure at a higher than desired amount. This could lead to the hydraulic cylinder barrel to bulge or split. It could also result in grapple structural damage due to the high pressure locked in a cap side of the hydraulic grapple cylinder. As such, there is a need for a new and improved hydraulic cylinder with a pressure relief system to mitigate hydraulic barrel damage and prolong the life of such hydraulic cylinders and the grapple mechanism overall.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation grapple hydraulic cylinder may comprise a barrel body and a piston-rod assembly operably connected to the barrel body. The piston-rod assembly and the barrel body define a rod side chamber. A cap may be operably connected to the barrel body. The cap and barrel body define a cap side chamber. A pressure relief system may be operably connected to the rod side chamber and the cap side chamber and configured to move hydraulic fluid between the cap side chamber and the rod side chamber to reduce pressure in the cap side chamber or the rod side chamber.

In another implementation, the pressure relief system may further comprise a first valve and a second valve. The second valve may be a relief valve configured to open upon the cap side chamber or the rod side chamber reaching a predetermined pressure.

In yet another implementation, the first valve is configured to lock to maintain hydraulic fluid and pressure in the cap side chamber.

Further, one implementation may comprise the first valve being a pilot operated check valve.

Another implementation for a grapple hydraulic cylinder may comprise the pressure relief system moving the hydraulic fluid from the cap side chamber to the rod side chamber to reduce pressure in the cap side chamber.

In another implementation for the grapple hydraulic cylinder, the pressure relief system may be integrated with the cap.

Further yet, in an implementation for the grapple hydraulic cylinder, the pressure relief system may further comprise a first valve and a second valve. The second valve may be a relief valve configured to open upon the cap side chamber or the rod side chamber reaching a determined pressure.

In yet another implementation for the grapple hydraulic cylinder, the first valve may be configured to lock to maintain hydraulic fluid and pressure in the cap side chamber.

Another implementation for the grapple hydraulic cylinder may comprise the cap having a cap side work port defined therein and the barrel body having a rod side work port defined therein The cap side work port may be in fluid communication with the cap side chamber. The rod side work port may be in fluid communication with the rod side chamber.

Further yet, in one implementation of the grapple hydraulic cylinder, the pressure relief system may be integrated into the cap and further comprise a first valve and a second valve where the second valve may be a relief valve. The cap side work port may be in fluid communication with the first valve. The relief valve may be in fluid communication with the cap side work port and rod side work port. The relief valve may be configured to open upon the cap side chamber reaching a determined pressure to move the hydraulic fluid from the cap side chamber to the rod side chamber to reduce pressure in the cap side chamber and increase pressure in the rod side chamber.

In another implementation for the grapple hydraulic cylinder, the first valve may be a pilot operated check valve. The pilot operated check valve may be configured to have a locked position to maintain the hydraulic fluid and pressure in the cap.

Yet in another implementation of the grapple hydraulic cylinder, the grapple may comprise a closed position and an open position. The grapple may be configured to maintain holding a selected load and simultaneously have pressure relieved from the cap side chamber by way of the relief valve when the cap side chamber reaches a determined pressure.

In another implementation of the grapple hydraulic cylinder, the pressure relief system may be configured to increase pressure in the rod side chamber until the selected load is removed. Pressure in the rod side chamber may be increased until the first valve is opened. Alternatively, pressure in the rod side chamber may be increased until the relief valve is opened to a tank reservoir.

Further, in another implementation for the grapple hydraulic cylinder the pressure relief system may be configured to open the relief valve so that the piston-rod assembly retracts and the grapple opens.

For the grapple hydraulic cylinder, the cap side chamber may have a through hole defined therein for fluid communication from the cap side chamber through the relieve valve and to the rod side chamber.

In one implementation, the grapple hydraulic cylinder may comprise a barrel body, a piston-rod assembly, a cap, and a pressure relief system. The piston-rod assembly may be operably connected to the barrel body. The piston-rod assembly and the barrel body may define a rod side chamber. The rod side chamber may have a rod side work port defined therein. The cap may be operably connected to the barrel body. The cap and the barrel body may define a cap side chamber. The cap side chamber may have a cap side work port defined therein. The pressure relief system may be operably connected to the rod side chamber and the cap side chamber. The pressure relief system may be configured to move the hydraulic fluid from the cap side chamber to the rod side chamber to reduce pressure in the cap side chamber. The pressure relief system may comprise a first valve comprising an open position and a locked position. The pressure relief system may comprise a second valve. The second valve may be a relief valve configured to open upon the cap side chamber reaching a determined pressure while the first valve is in the locked position.

In another implementation for the grapple hydraulic cylinder, the first valve may be a pilot operated check valve. The grapple may comprise a closed position and an open position. The grapple may be configured to maintain holding a selected load when the pilot operated check valve is in the locked position. The pressure relief system may be configured to open the relief valve upon the cap side chamber reaching a determined pressure. The pressure relief system may be configured to increase pressure in the rod side chamber and decrease pressure in the cap side chamber as the piston-rod assembly retracts and the grapple partially opens until an acceptable pressure is reached on the cap side chamber.

In another implementation for a grapple hydraulic cylinder, the grapple hydraulic cylinder may comprise a barrel body, a piston-rod assembly, a cap, and a pressure relief system. The piston-rod assembly may be operably connected to the barrel body. The piston-rod assembly and the barrel body may define a rod side chamber. The rod side chamber may have a rod side work port defined therein. The cap may be operably connected to the barrel body. The cap and the barrel body may define a cap side chamber. The cap side chamber may have a cap side work port defined therein. The pressure relief system may be integrated with the cap and configured to move the hydraulic fluid from the cap side chamber to the rod side chamber to reduce pressure in the cap side chamber and increase pressure in the rod side chamber. The pressure relief system may comprise a pilot operated check valve having an open position and a locked position. The pilot operated check valve may be and in fluid communication with the cap side chamber. The relief valve may be in fluid communication with the cap side chamber and the rod side work port. The relief valve may be configured to automatically open upon the cap side chamber reaching a determined pressure while the first valve is in the locked position.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

Figure 1A:
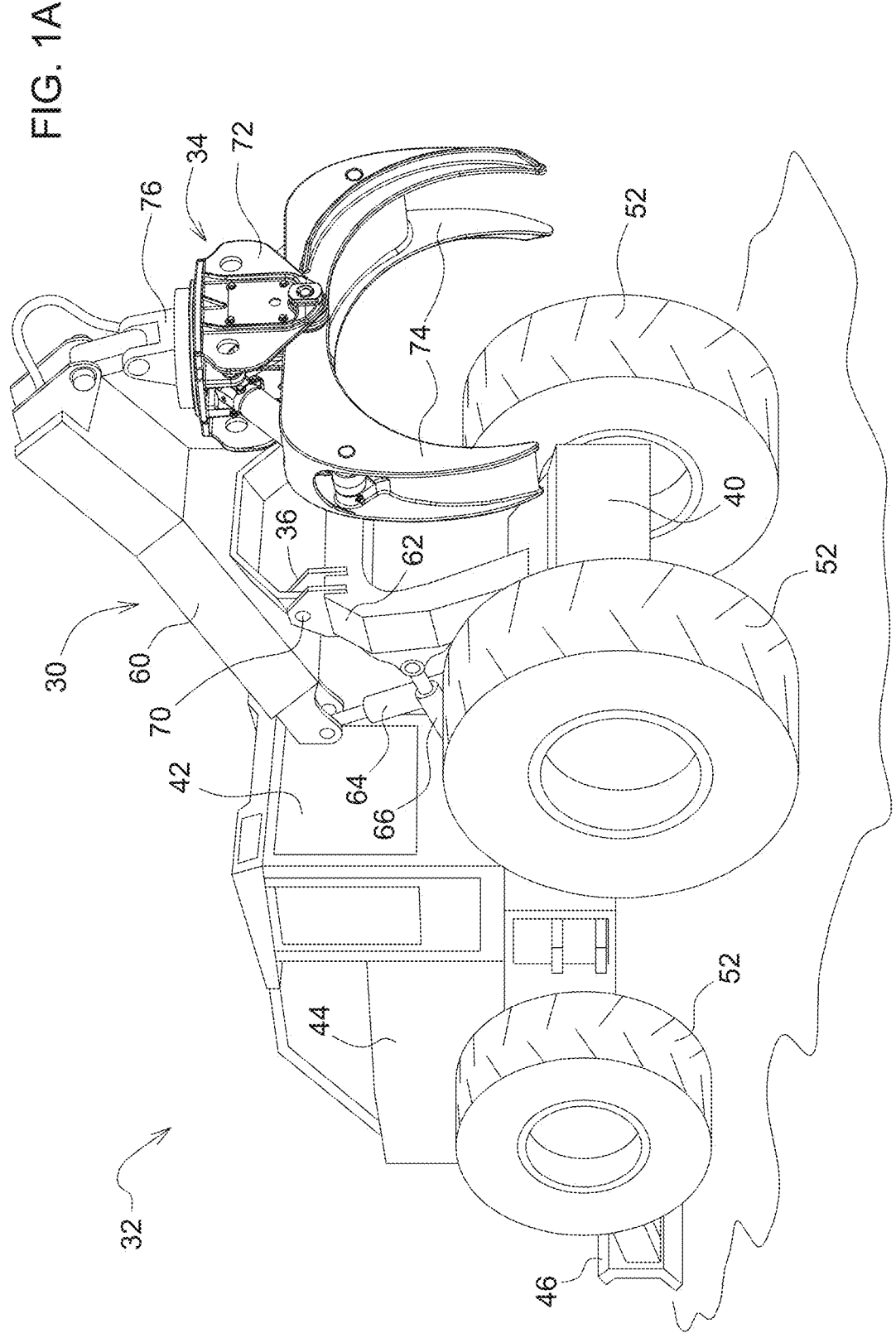
FIG. 1A is a perspective view of a work machine.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Figure 1B:
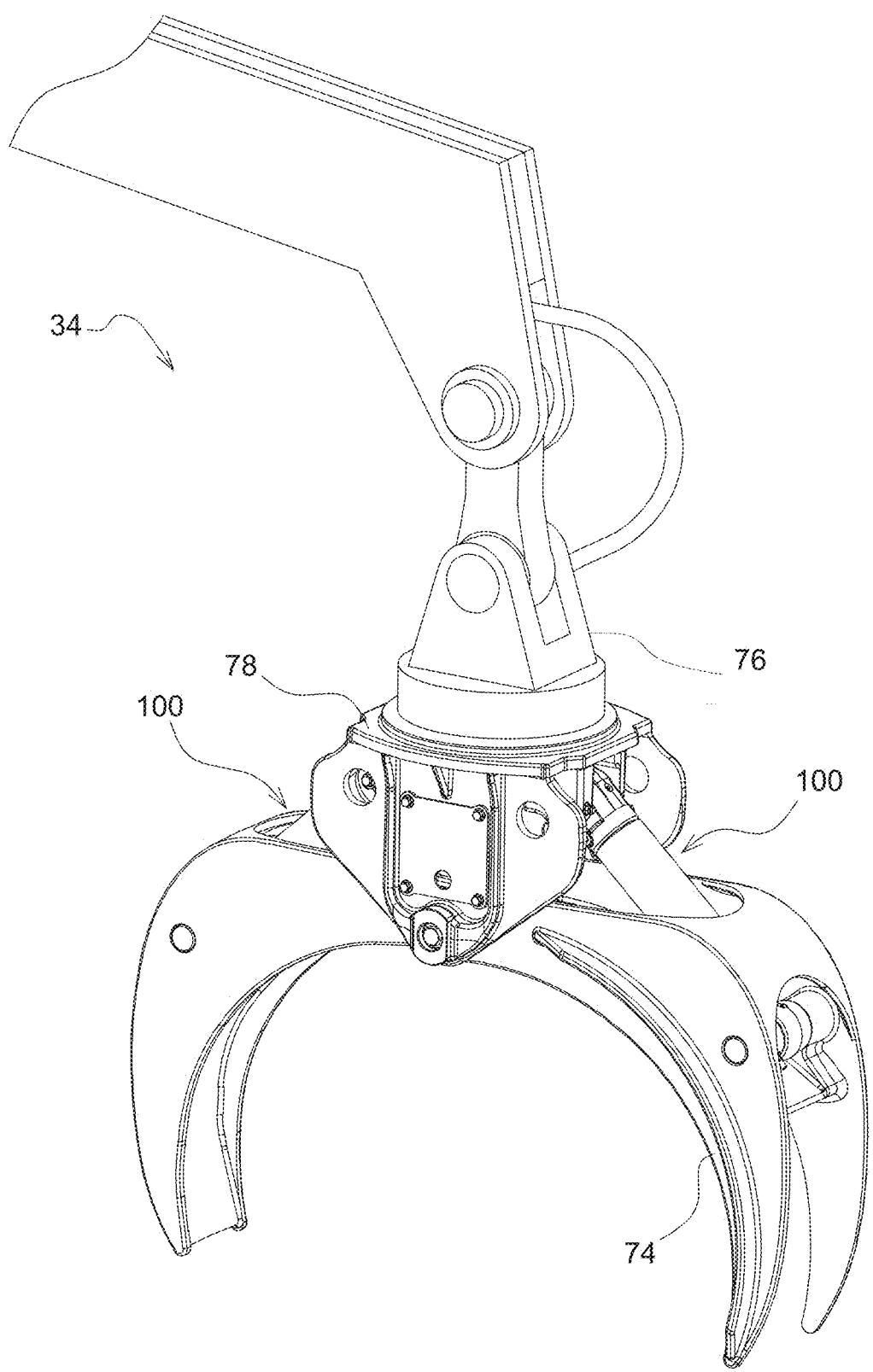
FIG. 1B in an enlarged view of a grapple.
Figure 2:
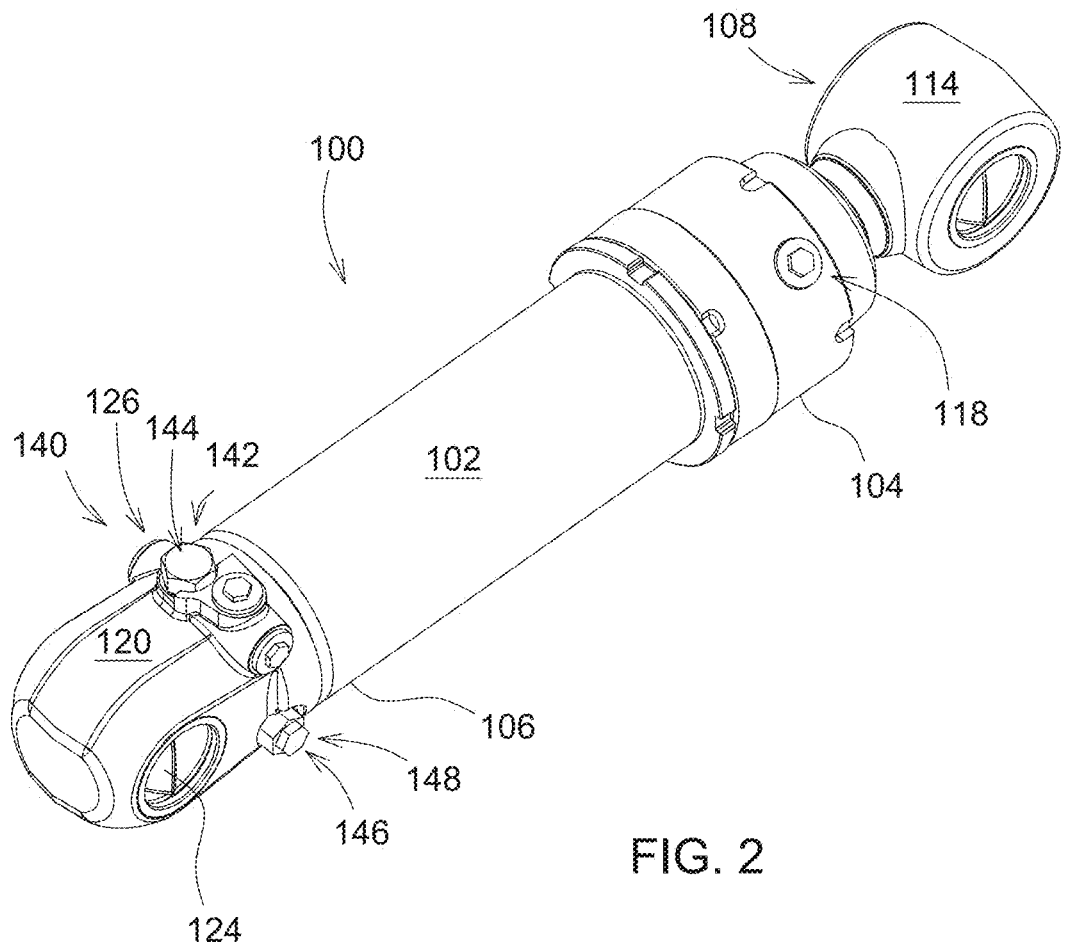
FIG. 2 is a perspective view of an example of a hydraulic cylinder with a pressure relief system.
Figure 3:
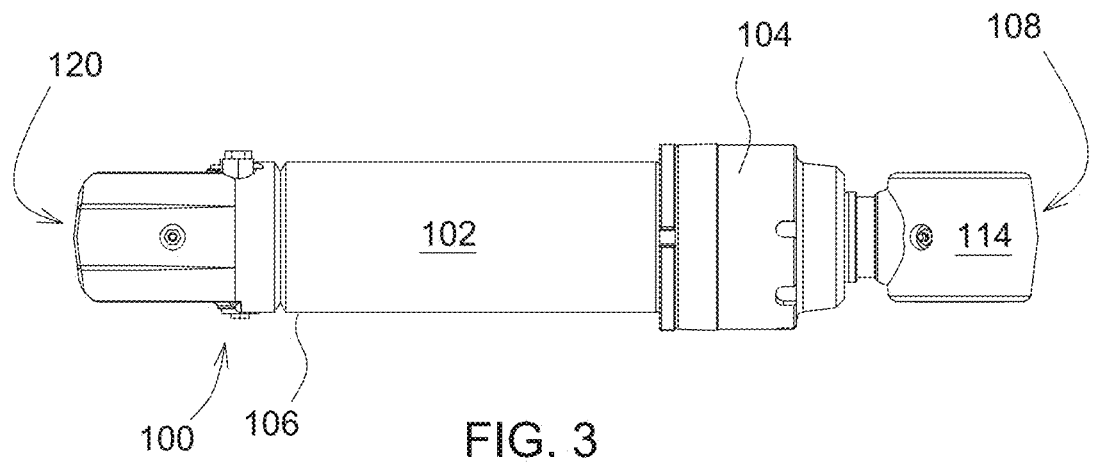
FIG. 3 is a top view of a hydraulic cylinder with a pressure relief system.

As shown in FIGS. 1A and 1B, a work machine such as a skidder 32, may have a grapple 34 to move objects such as logs, rocks, pipe laying, debris, and scrap metal. A boom 60 suspends a grapple 34 at a distal end thereof so that the grapple 34 can be maneuvered to a work area behind the skidder 32. The work machine with the grapple 34 may be utilized to move logs, rocks, pipe laying, debris, and scrap metal. A boom support arch 62 is mounted to a chassis 40 at a pivot mount generally at the level of a chassis 40, and the boom 60 is mounted to the boom support arch 62 at an elevated pivot mount 70. From within the cabin 42, the operator controls the height of the grapple 34 primarily by activating the boom actuator 64 to pivot the boom 60 about the boom support arch 62 and controls the reach of the grapple 34 primarily by activating the boom support actuator 66 to pivot the boom support arch 62, and thereby also the boom 60, about the chassis 40. As is known, the operator can further articulate the grapple 34 in position to clamp against the objects, such as logs and felled trees, that are to be dragged away by the skidder 32. The grapple 34 itself can be any suitable conventional grapple mechanism, such as a heavy-duty hydraulic logging grapple having a grapple head 72 and a large pair of opposed grapple tongs 74. The grapple 34 and thus the grapple tongs 74 may comprise a closed position and an open position. The grapple head 72 can include grapple hydraulic cylinder 100 as shown in FIG. 1B for actuating the grapple tongs 74 to open and close. The grapple 34 can mount to the boom 60 by a head joint and hydraulic motor assembly 76, which permits the operator to rotate the grapple 34 up to 360 degrees as needed to properly orient the grapple tongs 74.

FIGS. 2, 3, 4A, and 4B illustrate a grapple hydraulic cylinder 100. The grapple hydraulic cylinder 100 may comprise a barrel body 102 and a piston-rod assembly 108 operably connected to the barrel body 102. The barrel body 102 has a first end 104 and a distal second end 106. The piston-rod assembly 108 may comprise a piston 110 attached to a rod 112 where the piston 110 slidably translates within the barrel body 102. The rod 112 may be operably connected to the piston 108 on a first end 114 proximate the first end 104 of the barrel body 102 and operably connected to the grapple tongs 74 proximate a second end 116. The barrel body 102 having a rod side work port 118 defined therein.

A cap 120 may be operably connected to the barrel body proximate the second end 106 of the barrel body. The cap 120 comprises a cap body 122 with a bore 124 for operatively connecting the hydraulic cylinder 100 to mounting plates of the grapple 34. The cap body 122 may have a cap side work port 126 defined therein.

The barrel body 102 and the rod side of the piston define a rod side chamber 128. The cap 120 and the barrel body 102 define a cap side chamber 130. The cap side work port 126 may be in fluid communication with the cap side chamber 130. The rod side work port 118 may be in fluid communication with the rod side chamber 128.

Figure 4A:
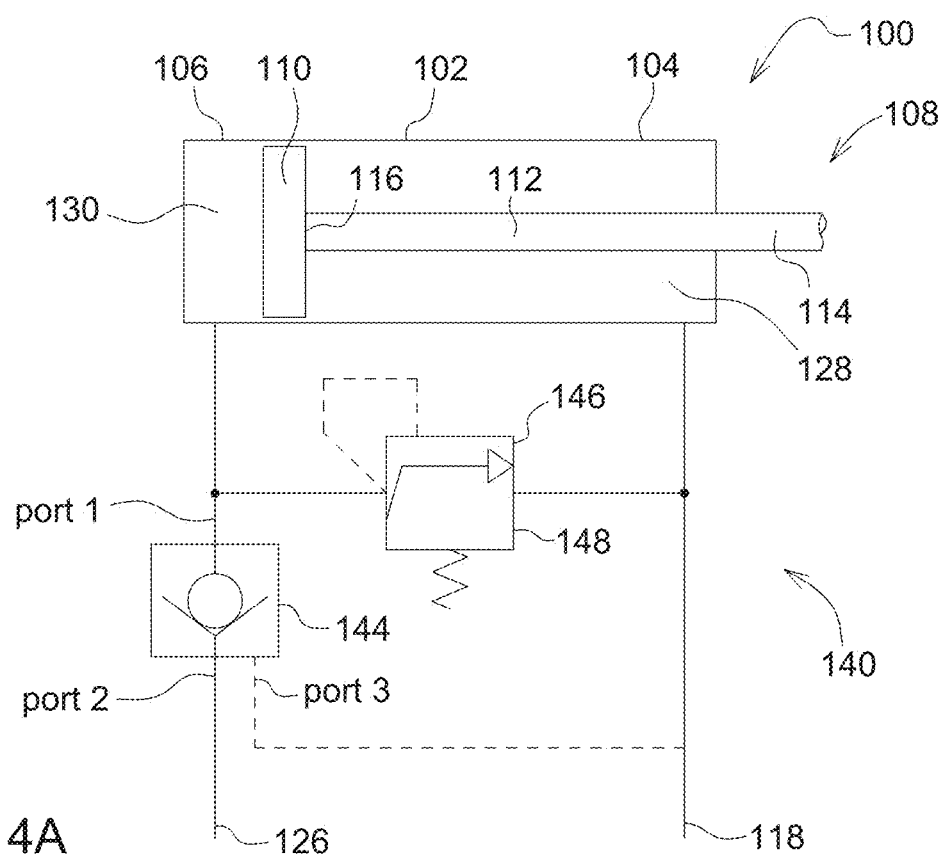
FIG. 4A is a schematic view of a hydraulic cylinder with a pressure relief system.
Figure 4B:
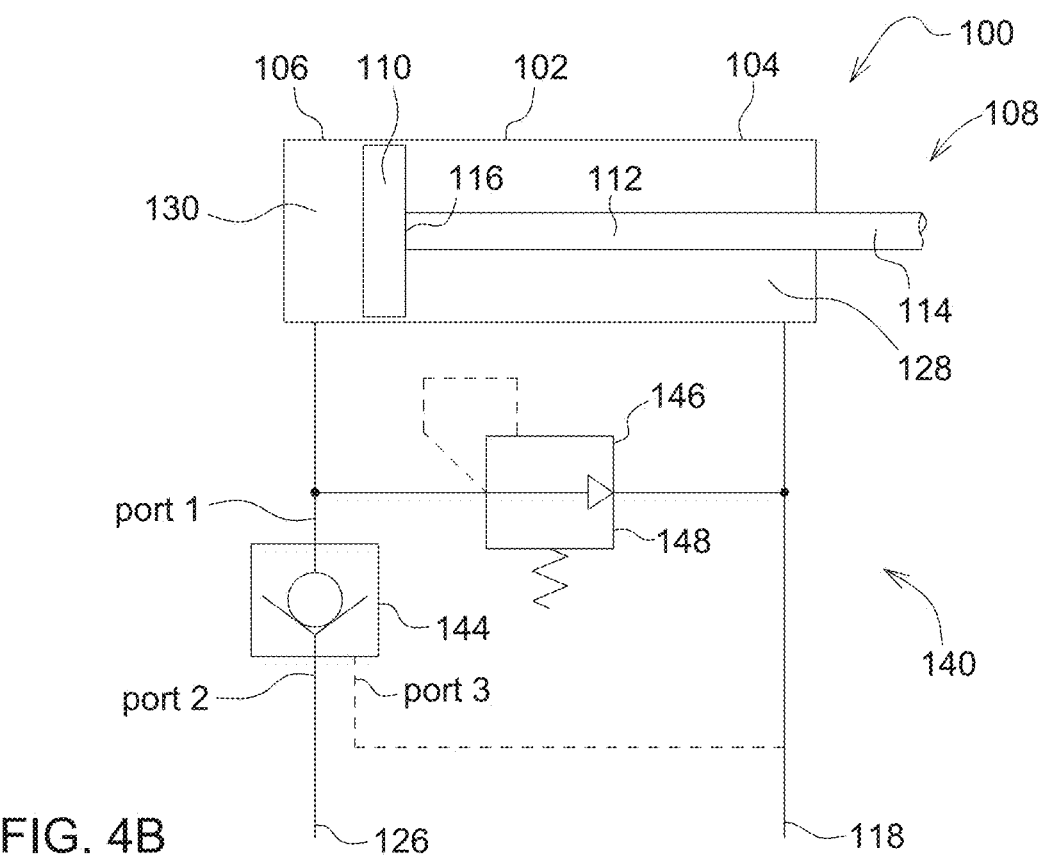
FIG. 4B is another schematic view of a hydraulic cylinder with a pressure relief system.
Figure 5:
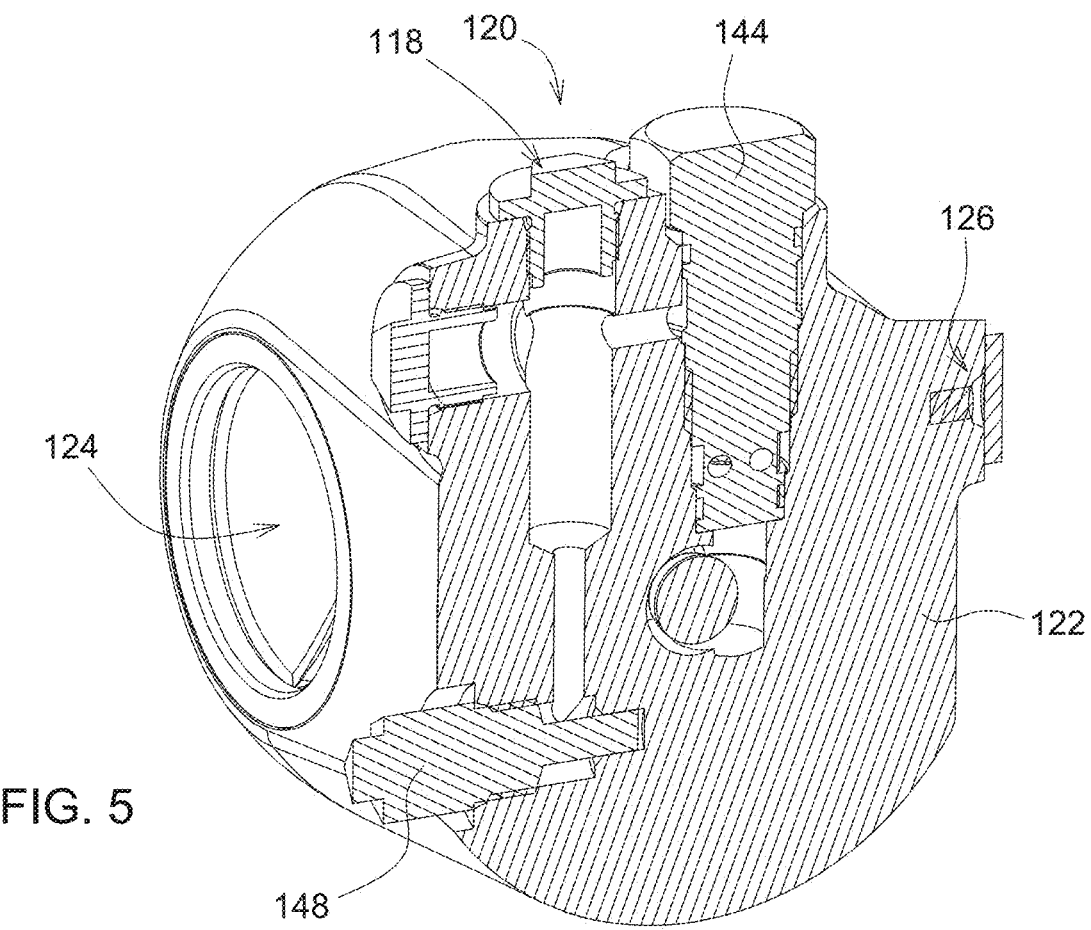
FIG. 5 is a perspective view of a cross section through a cap of a hydraulic cylinder.
Figure 6:
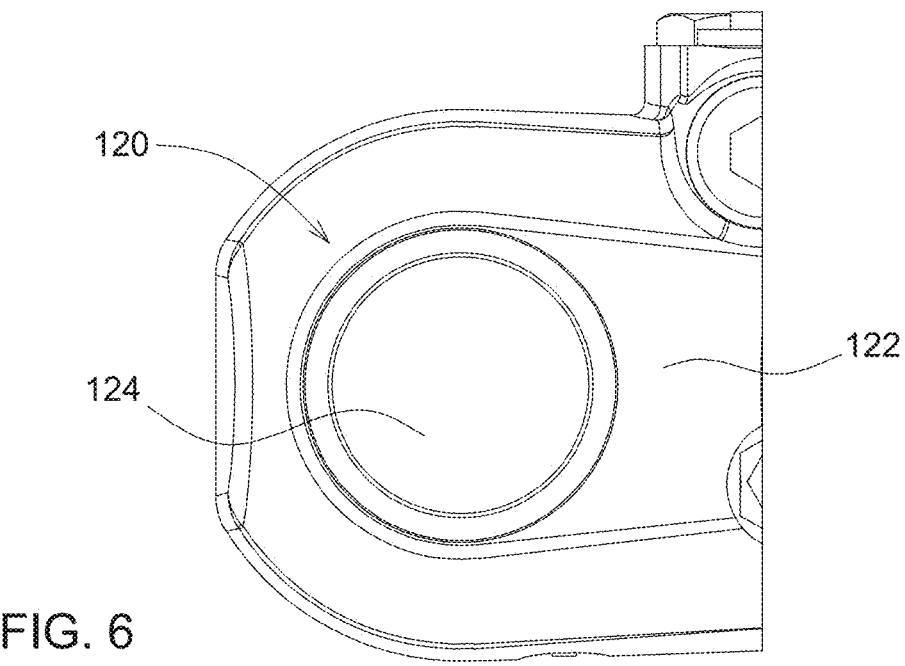
FIG. 6 is a side view of FIG. 5.
Figure 7:
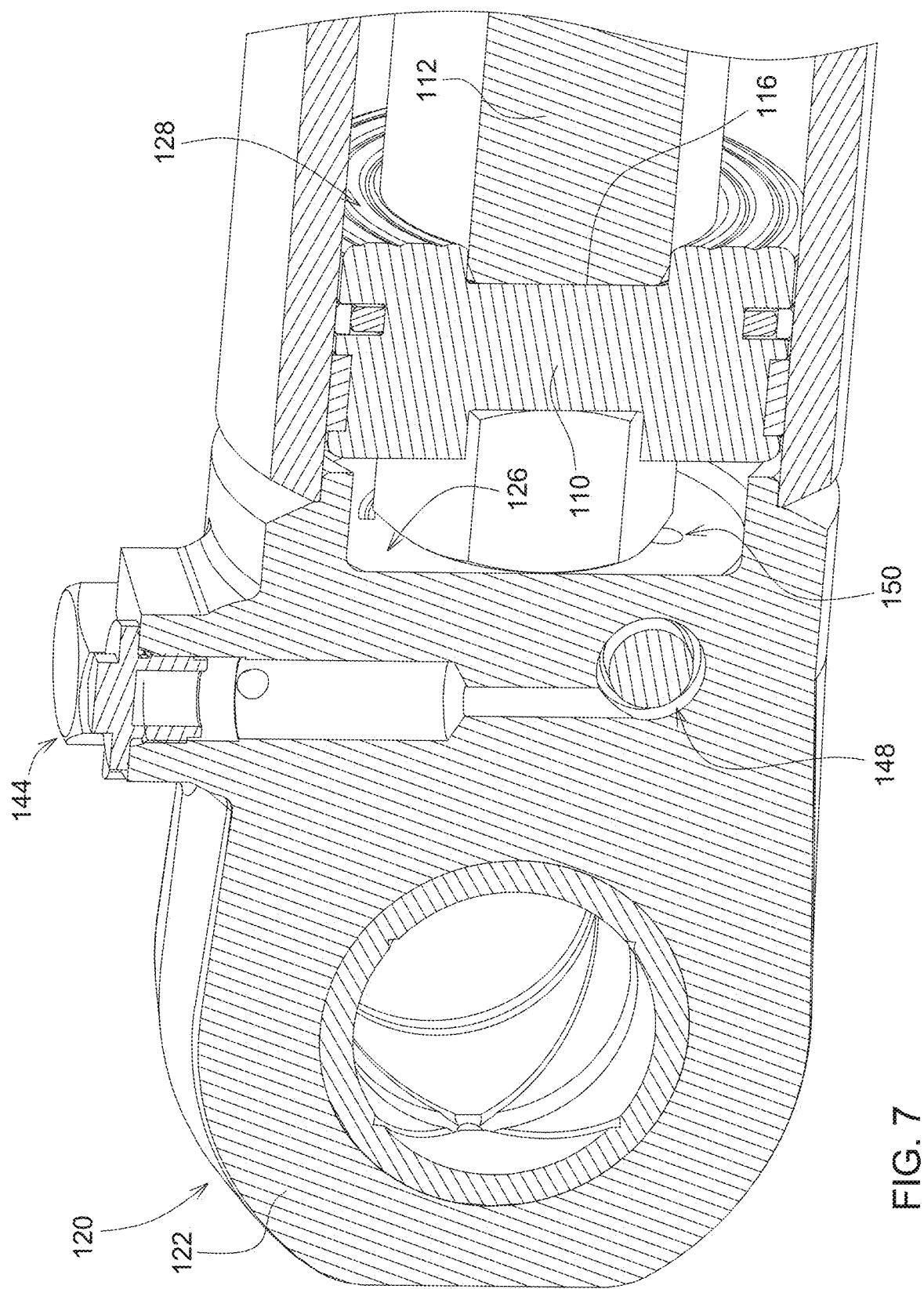
FIG. 7 is another perspective view of a cross section through a rod side work port.
Figure 8:
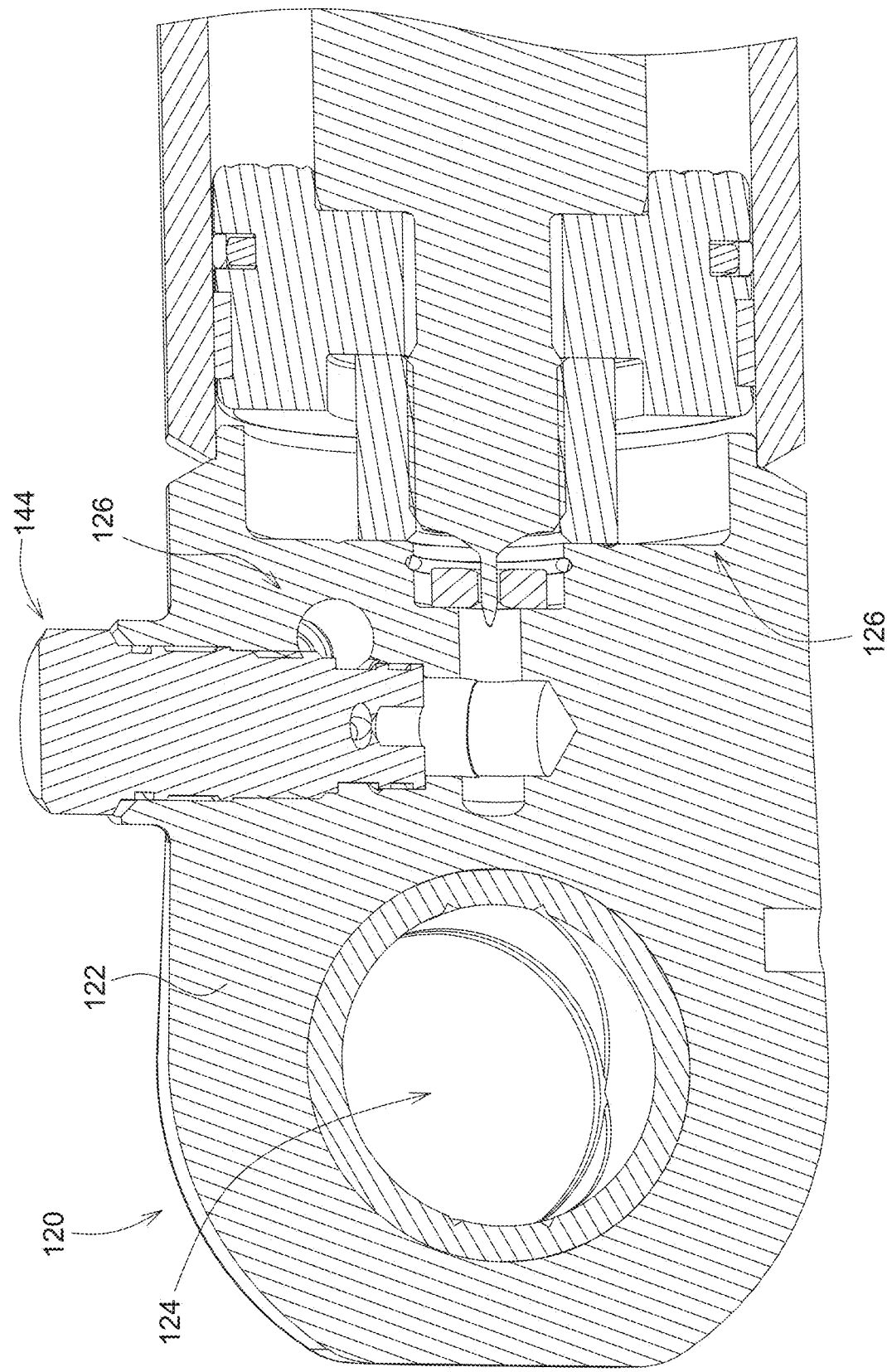
FIG. 8 is another perspective view of a cross section though a cap.
Figure 9:
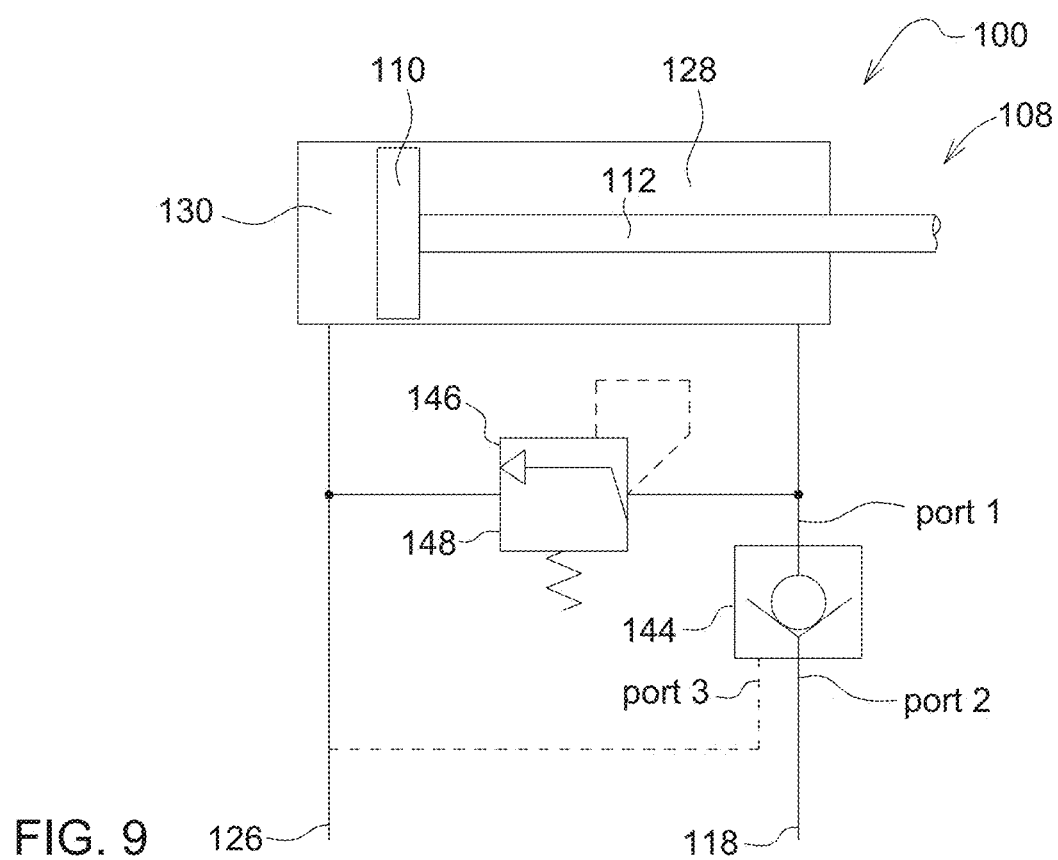
FIG. 9 is another implementation of a hydraulic cylinder with a pressure relief system.

As shown in FIGS. 4A, 4B, and 9, force can be to the piston-rod assembly 108 to push and pull so that hydraulic fluid flows into and out of the cap side chamber 130 and the rod side chamber 128 as desired. For instance, as the force pushes the piston-rod assembly 108 proximate the first end 114 in FIGS. 4A and 4B, the cap side chamber 130 experiences increased pressure as a volume of the cap side chamber 130 may decrease as it contains a determined volume of hydraulic fluid, which opens the grapple tongs 74. As a force pulls on the piston-rod assembly 108 as shown in FIG. 9, the volume of the cap side chamber 130 increases, thereby decreasing the pressure from hydraulic fluid and closes the grapple tongs 74. In this instance, pressure increases in the rod side chamber 128 as the rod side chamber 128 volume decreases and has a determined amount of hydraulic fluid.

FIGS. 4A, 4B, and 5-8 show a pressure relief system 140. The pressure relief system 140 may be operably connected to the rod side chamber 128 and the cap side chamber 130 and configured to move hydraulic fluid between the cap side chamber 130 and the rod side chamber 128. The configuration reduces pressure in the cap side chamber 130 when hydraulic fluid is moved from the cap side chamber 130 to the rod side chamber 128. When hydraulic fluid moves from the rod side chamber 128 to the cap side chamber 130, pressure is reduced in the rod side chamber 128. By reducing undesired pressure or high pressure in the cap side chamber 130 or the rod side chamber 128, the integrity of the hydraulic cylinder 100 is maintained, and thus, the undesired forces on the work machine structure itself are reduced. In one example implementation, the pressure relief system 140 may be integrated with the cap 120.

The pressure relief system 140 may further comprise a first valve 142 and a second valve 146. The first valve 142 is configured to lock to maintain hydraulic fluid and pressure in the cap side chamber 130. The first valve 142 may be a valve configured to be on or off with no flow metering or flow modulation of hydraulic fluid through the valve. The cap side chamber 130 may be in fluid communication with the first valve 142. The first valve 142 may be configured to lock to maintain hydraulic fluid and pressure in the cap side chamber 130. One nonlimiting example of such valve is a pilot operated check valve 144. The pilot operated check valve 144 enables free flow of hydraulic fluid from the valve the to the cap side chamber 130 from port 2 to port 1, which blocks fluid flow in the opposite direction. With fluid flow blocked, the pilot operated check valve 144 is locked, and the grapple tongs 74 are in the operators desired position and will not move into a different position until the operator opens the pilot operated check valve 144. When a determined pressure is sensed at the pilot at port 3, the valve opens from port 1 to port 2 enabling hydraulic fluid to flow in or out of the cap 120 chamber. The sensed pressure is from the rod side work port 118. This enables the operator to move the grapple tongs 74 to the desired position.

The second valve 146 may be a relief valve 148 configured to open upon the cap side chamber 130 or the rod side chamber 128 reaching a determined pressure. The relief valve 148 may be in fluid communication with the cap side chamber 130 and the rod side work port 118. The relief valve 148 may be configured to open upon the cap side chamber 130 reaching a determined pressure to move the hydraulic fluid from the cap side chamber 130 to the rod side chamber 128 to reduce pressure in the cap side chamber 130 and increase pressure in the rod side chamber 128. The relief valve 148 may be in a normally closed position while the pilot operated check valve 144 is in a closed position, as shown in FIG. 4A. If high pressure is sensed in the cap side chamber 130, the relief valve 148 will open while the pilot operated check valve 144 simultaneously remains closed, as shown in FIG. 4B. With the relief valve 148 open, the hydraulic fluid will move from the cap side chamber 130 to the rod side chamber 128, and thus, reduce the pressure in the cap 120 chamber. As such, the grapple 34, and thus the grapple tongs 74, may be configured to maintain holding a selected load and simultaneously have pressure relieved from the cap side chamber 130 by way of the relief valve 148 when the cap side chamber 130 reaches a determined pressure. The cap body 122 may have a through hole 150 defined therein, such that when the relief valve 148 opens, there is fluid communication from the cap side chamber 130 through the relieve valve so that hydraulic fluid may be removed from the cap 120 chamber and to the rod side chamber 128. The first valve 142, such as the pilot operated check valve 144, and the relief valve 148 may be integrated into the cap 120.

In another implementation of the grapple hydraulic cylinder 100, the pressure relief system 140 may be configured to increase pressure in the rod side chamber 128 until the selected load is removed. Pressure in the rod side chamber 128 may be increased until the first valve 142 is opened. Alternatively, pressure in the rod side chamber 128 may be increased until the relief valve 148 is opened to a tank reservoir. The pressure relief system 140 may be configured to open the relief valve 148 so that the piston-rod assembly 108 retracts and the grapple 34, and thus the grapple tongs 74, open. In an example implementation, the grapple 34 may open only slightly until the pressure in the cap side chamber 130 reaches an acceptable limit, and then once the high pressure is relieved, the relief valve 148 will close and the grapple 34 will hold its position.

FIG. 9 illustrates an alternate implementation of a hydraulic cylinder 100 having an integrated pressure relief system 140. The first valve 142 is positioned to be in fluid communication with the rod chamber. The relief valve 148 when opened transmits fluid from the rod side chamber 128 to the cap side chamber 130.

With such a configuration with the first valve 142, such as the pilot operated check valve 144, and the relief valve 148 being disposed in the cap 120, replacement of the hydraulic cylinder 100 is simplified. For example, a replacement hydraulic cylinder 100 may be a drop-in replacement. No additional hoses or manifolds are required to reduce high pressure being experienced in the cap 120 chamber. Extreme pressure spikes are reduced, protecting the hydraulic cylinder 100, the overall hydraulic system, and related structures. Further, there is no significant change in performance relating to load holding and grapple speed by adding the pressure relief system 140 into the cap 120.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A grapple hydraulic cylinder, comprising:
   a barrel body;
   a piston-rod assembly operably connected to the barrel body, the piston-rod assembly and barrel body defining a rod side chamber; and
   a cap operably connected to the barrel body, the cap and the barrel body defining a cap side chamber, and the cap having a through hole defined therein for fluid communication from the cap side chamber to the rod side chamber; and
   a pressure relief system integrated with the cap and operably connected to the rod side chamber and the cap side chamber and configured to move hydraulic fluid between the cap side chamber and the rod side chamber to reduce pressure in the cap side chamber or the rod side chamber, comprising:
   a pilot operated check valve; and
   a relief valve configured to open upon the cap side chamber or the rod side chamber reaching a predetermined pressure.

2. The grapple hydraulic cylinder of claim 1, wherein the pilot operated check valve is configured to lock to maintain hydraulic fluid and pressure in the cap side chamber.

3. The grapple hydraulic cylinder of claim 1, wherein the pressure relief system moves the hydraulic fluid from the cap side chamber to the rod side chamber to reduce pressure in the cap side chamber.

4. The grapple hydraulic cylinder of claim 3, wherein the cap has a cap side work port defined therein and the barrel body has a rod side work port defined therein, the cap side work port in fluid communication with the cap side chamber and the rod side work port in fluid communication with the rod side chamber.

5. The grapple hydraulic cylinder of claim 4, wherein the cap side chamber is in fluid communication with the pilot operated check valve and the relief valve is in fluid communication with the cap side chamber and the rod side work port, the relief valve configured to open upon the cap side chamber reaching a determined pressure to move the hydraulic fluid from the cap side chamber to the rod side chamber to reduce pressure in the cap side chamber and increase pressure in the rod side chamber.

6. The grapple hydraulic cylinder of claim 5, wherein the pilot operated check valve is configured to have a locked position to maintain the hydraulic fluid and pressure in the cap.

7. The grapple hydraulic cylinder of claim 5, wherein the grapple comprises a closed position and an open position, the grapple configured to maintain holding a selected load and simultaneously having pressure relieved from the cap side chamber by way of the relief valve when the cap side chamber reaches a determined pressure.

8. The grapple hydraulic cylinder of claim 7, wherein the pressure relief system is configured to increase pressure in the rod side chamber until the selected load is removed, the pilot operated check valve is opened, or the relief valve is opened to a tank reservoir.

9. The grapple hydraulic cylinder of claim 8, wherein the pressure relief system is configured to open the relief valve so that the piston-rod assembly retracts and the grapple opens.

10. The grapple hydraulic cylinder of claim 5, wherein the cap side chamber has a through hole defined therein for fluid communication from the cap side chamber through the relieve valve and to the rod side chamber.

11. The grapple hydraulic cylinder of claim 1, wherein the pilot operated check valve is configured to lock to maintain hydraulic fluid and pressure in the cap side chamber.

12. A grapple hydraulic cylinder, comprising:
    a barrel body;
    a piston-rod assembly operably connected to the barrel body, the piston-rod assembly and barrel body defining a rod side chamber, the rod side chamber having a rod side work port defined therein; and
    a cap operably connected to the barrel body, the cap and the barrel body defining a cap side chamber, the cap side chamber having a cap side work port defined therein; and a pressure relief system operably connected to the rod side chamber and the cap side chamber and configured to move the hydraulic fluid from the cap side chamber to the rod side chamber to reduce pressure in the cap side chamber, the pressure relief system, comprising:
a first valve comprising an open position and a locked position; and
a second valve, the second valve being a relief valve configured to open upon the cap side chamber reaching a determined pressure while the first valve is in the locked position.

13. The grapple hydraulic cylinder of claim 12, wherein the first valve is a pilot operated check valve, wherein the cap side chamber is in fluid communication with the first valve and the relief valve is in fluid communication with the cap side chamber and rod side work port.

14. The grapple hydraulic cylinder of claim 13, wherein the pilot operated check valve and the relief valve are integrated with the cap.

15. The grapple hydraulic cylinder of claim 12, wherein the first valve is a pilot operated check valve, the grapple comprises a closed position and an open position, the grapple configured to maintain holding a selected load when the pilot operated check valve is in the locked position;
wherein the pressure relief system is configured to:
open the relief valve upon the cap side chamber reaching a determined pressure;
increasing pressure in the rod side chamber and decreasing pressure in the cap side chamber as the piston-rod assembly retracts and the grapple partially opens until an acceptable pressure is reached on the cap side chamber.

16. A grapple hydraulic cylinder, comprising:
a barrel body;
a piston-rod assembly operably connected to the barrel body, the piston-rod assembly and barrel body defining a rod side chamber, the rod side chamber having a rod side work port defined therein; and
a cap operably connected to the barrel body, the cap and the barrel body defining a cap side chamber, the cap side chamber having a cap side work port defined therein; and
a pressure relief system integrated with the cap and configured to move the hydraulic fluid from the cap side chamber to the rod side chamber to reduce pressure in the cap side chamber and increase pressure in the rod side chamber, the pressure relief system, comprising:
a pilot operated check valve comprising an open position and a locked position and in fluid communication with the cap side chamber; and
a relief valve in fluid communication with the cap side chamber and the rod side work port, the relief valve configured to automatically open upon the cap side chamber reaching a determined pressure while the first valve is in the locked position.

17. A grapple hydraulic cylinder comprising:
a barrel body;
a piston-rod assembly operably connected to the barrel body, the piston-rod assembly and barrel body defining a rod side chamber; and
a cap operably connected to the barrel body, the cap and the barrel body defining a cap side chamber; and
a pressure relief system integrated with the cap and operably connected to the rod side chamber and the cap side chamber and configured to move hydraulic fluid between the cap side chamber and the rod side chamber to reduce pressure in the cap side chamber or the rod side chamber, comprising:
a pilot operated check valve; and
a relief valve configured to open upon the cap side chamber or the rod side chamber reaching a predetermined pressure,
wherein the grapple comprises a closed position and an open position, the grapple configured to maintain holding a selected load and simultaneously having pressure relieved from the cap side chamber by way of the relief valve when the cap side chamber reaches a determined pressure.

18. The grapple hydraulic cylinder of claim 17, wherein the pressure relief system is configured to increase pressure in the rod side chamber until the selected load is removed, the pilot operated check valve is opened, or the relief valve is opened to a tank reservoir.

19. The grapple hydraulic cylinder of claim 18, wherein the pressure relief system is configured to open the relief valve so that the piston-rod assembly retracts and the grapple opens.

* * * * *